United States Patent [19]

Sandstrom et al.

[11] Patent Number: 5,756,589
[45] Date of Patent: May 26, 1998

[54] SILICA REINFORCED RUBBER COMPOSITION AND USE IN TIRES

[75] Inventors: Paul Harry Sandstrom, Tallmadge; David John Zanzig, Uniontown; Mark Samuel Sinsky, Akron, all of Ohio

[73] Assignee: Goodyear Tire & Rubber Company, Akron, Ohio

[21] Appl. No.: 716,692

[22] Filed: Sep. 19, 1996

[51] Int. Cl.$^6$ ..................................................... C08F 8/30
[52] U.S. Cl. .......................... 525/333.1; 525/88; 525/93; 525/189; 525/192; 525/212; 525/333.2; 525/333.3; 525/333.5; 524/500; 524/505; 524/521; 524/571; 524/573.5; 152/564
[58] Field of Search ..................... 525/88, 93, 189, 525/192, 212, 333.1, 333.2, 333.3, 333.5; 524/500, 505, 521, 571, 573.5; 152/564

[56] References Cited

U.S. PATENT DOCUMENTS 4,607,078  8/1986  Dergazarian ........................... 525/64

*Primary Examiner*—Duc Truong
*Attorney, Agent, or Firm*—Henry C. Young, Jr.

[57] ABSTRACT

The present invention relates to a rubber composition containing substantial silica reinforcement and pneumatic tires having treads comprised of such rubber composition. The rubber composition comprises an elastomer, substantial silica reinforcement, optionally a minor amount of carbon black reinforcement, and a triblock copolymer of terminal hard styrene based segments and of internal diene based elastomer segments.

14 Claims, No Drawings

SILICA REINFORCED RUBBER COMPOSITION AND USE IN TIRES

FIELD

This invention relates to rubber compositions which contain a quantitative amount of silica reinforcement and a minor amount, if any, of carbon black reinforcement and to tires having treads thereof.

BACKGROUND

For various applications utilizing rubber which require high strength and abrasion resistance, particularly applications such as tires and various industrial products, sulfur cured rubber is utilized which contains substantial amounts of reinforcing fillers. Carbon black is commonly used for such purpose and normally provides or enhances good physical properties for the sulfur cured rubber. Particulate silica is also often used for such purpose, particularly when the silica is used in conjunction with a coupling agent. In some cases, a combination of silica and carbon black is utilized for reinforcing fillers for various rubber products, including treads for tires.

Conventionally, tire treads of diene based elastomer(s) reinforced with filler(s) composed of a major amount of precipitated silica and a minor amount, if any, of carbon black reinforcement have treadwear inferior to comparable tire treads reinforced with carbon black with a minor amount, if any, of silica.

This invention is involved with an inclusion of thermoplastic materials in the rubber composition.

In the description of this invention, the term "phr" where used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to rubber which has been blended or mixed with various ingredients and materials and such terms are well known to those having skill in the rubber mixing or rubber compounding art.

A reference to an elastomer's Tg refers to a glass transition temperature which can conveniently be determined by a differential scanning calorimeter at a heating rate of 10° C. per minute.

SUMMARY AND PRACTICE OF THE INVENTION

In accordance with one aspect of this invention, in a rubber composition which comprises (A) 100 parts by weight (phr) of elastomers composed of (i) about 50 to about 98, alternatively about 70 to about 95, phr of at least one elastomer selected from homopolymers of isoprene or 1,3-butadiene, copolymers of isoprene and 1,3-butadiene and copolymers of isoprene and/or 1,3-butadiene and styrene or alpha-methylstyrene, preferably styrene, and, correspondingly, (ii) about 2 to about 50, alternatively about 5 to about 30, phr of at least one triblock elastomer composed of terminal hard polystyrene segments and internal soft diene-based elastomer segment and having the general configuration of: A-B-A; wherein A represents said terminal hard polystyrene segments and B represents said internal soft diene-based elastomer segment and wherein the B component is about 20 to about 80 percent of said triblock elastomer, (C) about 20 to about 150, preferably about 25 to about 90, phr of filler composed of particulate, precipitated silica and carbon black, wherein said filler is composed of about 10 to about 100, alternatively about 20 to about 85, and further alternatively about 50 to about 80, phr of said silica, and wherein the weight ratio of silica to carbon black is at least about 1/1, preferably as a majority of said filler and alternatively in a range of about 1/1 to about 15/1, and (D) a coupler for said silica having a moiety reactive with the surface of said silica and another moiety interactive with said diene-based elastomer(s).

In another aspect of the invention, a tire is provided having a tread comprised of the said rubber composition.

In general, the triblock elastomer is represented by the formula A-B-A in which terminal blocks, A, can be the same or different, preferably the same, are thermoplastic homopolymers or copolymers of a vinyl aromatic compound such as, for example, styrene.

The center block, B, is an elastomeric polymer derived from conjugated dienes selected from 1,3-butadiene and isoprene.

The ratio of the A and B segments can vary widely. Frequently, the molecular weight of the center block, B, will be greater than that of the terminal blocks, A. The molecular weight of terminal block, A, may, for example, be within a range of about 2,000 to about 100,000, while the molecular weight of the center elastomer block, B, may, for example, be within a range of about 25,000 to about 1,000,000.

If desired, the triblock elastomer can be post-treated to hydrogenate the rubber portion of the triblock elastomer. Conventional hydrogenation methods can generally be used.

Diblock thermoplastic elastomers of the A-B type, such as those composed of polystyrene and polybutadiene or polyisoprene blocks, is contemplated herein as being an elastomer which could be used as a partial or total replacement for the aforesaid triblock A-B-A elastomer prescribed herein.

In one aspect, such a rubber composition can be provided as being sulfur cured. The sulfur curing is accomplished in a conventional manner, namely, by curing under conditions of elevated temperature and pressure for a suitable period of time.

In the practice of this invention, as hereinbefore pointed out, the rubber composition is comprised of at least one diene-based elastomer, or rubber. Thus, it is considered that the elastomer is a sulfur curable elastomer. Such diene based elastomer, or rubber, may be selected, for example, from at least one of cis 1,4-polyisoprene rubber (natural and/or synthetic, and preferably natural rubber) and, for example, synthetic polymers and copolymers of isoprene and butadiene and, for example, copolymers of nonconjugated dienes with aromatic vinyl compounds such as styrene and alpha-methylstyrene. Representative of such elastomers are, for example, cis 1,4-polyisoprene, cis 1,4-polybutadiene, medium vinyl polybutadiene containing about 35 to about 55 percent vinyl units, 3,4-polyisoprene, isoprene/butadiene copolymers, styrene/butadiene copolymers, styrene/isoprene copolymers, butadiene acrylonitrile copolymers, styrene/butadiene/acrylonitrile terpolymers and styrene/isoprene/butadiene terpolymers. It is appreciated that the styrene/butadiene elastomers may be organic solution or aqueous emulsion polymerization prepared.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR might be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, as E-SBAR, in amounts, for example, of about 2 to about 30 weight percent bound acrylonitrile in the terpolymer.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-polyisoprene elastomer and use thereof is more fully described in U.S. Pat. No. 5,087,668 which is incorporated herein by reference.

The cis 1,4-polybutadiene rubber is considered to be beneficial for a purpose of enhancing the tire tread's wear, or treadwear.

Such polybutadiene elastomer can be prepared, for example, by organic solution polymerization of 1,3-butadiene as is well known to those having skill in such art.

The polybutadiene elastomer may be conveniently characterized, for example, by having at least a 90% cis 1,4-content.

The cis 1,4-polyisoprene and cis 1,4-polyisoprene natural rubber are well known to those having skill in the rubber art.

The vulcanized rubber composition should contain a sufficient amount of silica, and carbon black if used, reinforcing filler(s) to contribute a reasonably high modulus and high resistance to tear. The combined weight of the silica and carbon black, as hereinbefore referenced, may be as low as about 20 parts per 100 parts rubber, but is more preferably from about 25 to about 90 parts by weight.

While it is considered herein that commonly employed siliceous pigments used in rubber compounding applications might be used as the silica in this invention, including pyrogenic and precipitated siliceous pigments (silica), precipitated silicas are preferred.

The siliceous pigments, preferably employed in this invention, are precipitated silicas such as, for example, those obtained by the acidification of a soluble silicate, e.g., sodium silicate. Such precipitated silicas are well known to those having skill in such art.

Such precipitated silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc such as, for example, Zeosil 1165MP and silicas available from Degussa AG with, for example, designations VN2 and VN3, etc.

The silica is conventionally used in conjunction with a silica coupler to connect the silica with the elastomer(s) and, thus, enhance the elastomer reinforcing effect of the silica.

Such coupling agents may, for example, be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are sometimes composed of a silane which has a constituent component, or moiety, (the silane portion) capable of reacting with the silica surface, usually with silanol groups normally contained on the silica surface, and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

Numerous coupling agents are taught for use in combining silica and rubber such as, for example, silane coupling agents containing a polysulfide component, or structure, such as bis-(3-triethoxysilylpropyl)tetrasulfide and/or polyisoprene rubber together with a mixture of silica and carbon black, with silica usually being required to be a major component of the silica/carbon black reinforcing filler.

In a practice of the invention, the said silica coupler can be, for example, a bis-(3-triethoxysilylpropyl) tetrasulfide.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s), for this invention, if used, are hereinbefore set forth. It is to be appreciated that the silica coupler may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the aforesaid rubber compounding ingredients are not considered to be an aspect of this invention which is more primarily directed to the use of the said triblock elastomer inclusion in a quantitatively silica reinforced rubber composition, particularly for use in tire treads.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, silica and silica coupler, and carbon black if used, are mixed in one or more non-productive mix stages. The terms "non-productive" and "productive" mix stages are well known to those having skill in the rubber mixing art.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

In this Example, a rubber composition is prepared which contained a linear A-B-A triblock elastomer as an S-B-S triblock elastomer containing 31 percent styrene (Kraton D-1101). In practice, the S-B-S triblock elastomer was used as a replacement for a 40 percent styrene containing butadiene/styrene emulsion polymerization prepared elastomeric copolymer (SBR). Two control rubber samples are also included in this study. One contains 12.8 phr coupling agent X50S (Control A) and the other contains 6.4 phr coupling agent X50S (Control B).

The rubber sample containing Kraton D-1101 (Experimental C) also contains the lower level of coupling agent matching the Control B rubber sample. The experimental Sample C was observed to exhibit improved abrasion resistance over Control A which contained the higher level of the coupling agent. It also shows superior abrasion resistance as compared to the Control B which contains an equivalent level of coupling agent. The replacement of the emulsion SBR copolymer with the S-B-S block type polymer was observed to provide an improved abrasion resistance and also to allow reduction of the coupling agent content in the rubber composition.

The rubber compositions containing the materials shown in Table 1 were prepared in a BR Banbury mixer using two separate, sequential stages of addition (mixing), namely, one non-productive mix stage and one final productive mix to temperatures of 160° C. and 120° C. and times of 7 minutes and 2 minutes, respectively. The physical properties for these compounds are compared in Table 2.

TABLE 1

|  | Control A | Control B | Exp C |
|---|---|---|---|
|  | 1st Non-Productive | | |
| E-SBR[1] | 25 | 25 | 0 |
| BR[2] | 20 | 20 | 20 |
| Natural Rubber | 10 | 10 | 10 |
| IBR[3] | 45 | 45 | 45 |
| Kraton D-1101[4] | 0 | 0 | 25 |
| X50S[5] | 12.8 | 6.4 | 6.4 |
| Silica[6] | 80 | 80 | 80 |

TABLE 1-continued

|  | Control A | Control B | Exp C |
|---|---|---|---|
| Processing Aids[7] | 30 | 30 | 30 |
| Antiozonant[8] | 2 | 2 | 2 |
| Productive Mix Stage | | | |
| Sulfur | 1.4 | 1.4 | 1.4 |
| Zinc Oxide | 2.5 | 2.5 | 2.5 |
| Antioxidants[9] | 1 | 1 | 1 |
| Accelerators[10] | 3.7 | 3.7 | 3.7 |

1) Emulsion polymerization prepared SBR obtainable from The Goodyear Tire & Rubber Company having 40% styrene and containing about 37.5 parts by weight aromatic oil per 100 parts of the elastomer. However, the amount of this material is recorded in Table 1 as a dry weight without the aforesaid oil.

2) Cis 1,4-polybutadiene rubber obtained as Budene® 1254 from The Goodyear Tire & Rubber Company.

3) An isoprene/butadiene copolymer elastomer obtained from The Goodyear Tire & Rubber Company with an isoprene content of about 50 percent and a Tg of about −45° C.

4) An S-B-S triblock elastomer (styrene-butadiene-styrene) available from the Shell Chemical Company reportedly having about a 31 percent polystyrene content and, correspondingly, about a 69 percent polybutadiene content.

5) Reported here as a blend of bis-3-(triethoxysilylpropyl) tetrasulfide and carbon black in a 50/50 ratio and available as X50S from Degussa A.G.

6) A silica obtained as Zeosil 1165MP from Rhone-Poulenc.

7) Rubber processing oil as being about 26.5 parts from the E-SBR and about 5 parts in the PBd, where the amounts of E-SBR and PBd are reported above on dry weight and in addition, about 17 parts additional processing oil, plasticizers, resins and waxes were added.

8) Santoflex 6PPD from the Monsanto company.

9) Wingstay® 100, from The Goodyear Tire & Rubber Company.

10) Combination of guanidine and sulfenamide type accelerators.

The following Table 2 illustrates the amounts of the triblock elastomer introduced into each of the experiments, other than the control Exp A as well as various physical properties of the cured samples. The samples had been cured at about 150° C. for about 18 minutes.

TABLE 2

| Sample | Control A | Control B | Exp C |
|---|---|---|---|
| Rheometer (150° C.) | | | |
| Max. Torque | 43.5 | 45.8 | 48.8 |
| Min. Torque | 12.2 | 23.0 | 26.5 |
| T$_{90}$, minutes | 17.0 | 14.0 | 18.0 |
| Stress-Strain | | | |
| Tensile Strength, MPa | 15.6 | 16.8 | 16.3 |
| Elongation at Break, % | 398 | 566 | 603 |
| 100% Modulus, MPa | 2.5 | 1.5 | 2.3 |
| 300% Modulus, MPa | 12.1 | 7.2 | 8.1 |

TABLE 2-continued

| Sample | Control A | Control B | Exp C |
|---|---|---|---|
| Hardness | | | |
| Shore A, 23° C. | 64 | 59 | 70 |
| Shore A, 100° C. | 62 | 56 | 63 |
| Rebound | | | |
| 23° C., % | 45 | 41 | 39 |
| 100° C., % | 66 | 59 | 53 |
| DIN Abrasion (cc volume loss) | 90 | 117 | 84 |

In particular, this Example shows that the inclusion of the A-B-A triblock elastomer, Kraton® D-1101, in the rubber composition of Experimental C provides significant improvements in abrasion resistance when compared to controls A and B which do not contain any of the triblock elastomer. This is considered to be important for consideration of use of the rubber composition in a tire tread because of improved treadwear.

While certain representative embodiments and details have been shown for the purpose of illustrating the invention, it will be apparent to those skilled in this art that various changes and modifications may be made therein without departing from the spirit or scope of the invention.

What is claimed is:

1. In a rubber composition which comprises (a) 100 parts by weight (phr) of elastomers composed of (i) about 50 to about 98 phr of at least one elastomer selected from homopolymers of isoprene or 1,3-butadiene, copolymers of isoprene and 1,3-butadiene and copolymers of isoprene and/or 1,3-butadiene and styrene or alpha-methylstyrene and, correspondingly, (ii) about 2 to about 50 phr of at least one triblock elastomer composed of terminal hard polystyrene segments and internal soft diene-based elastomer segment and having the general configuration of: A-B-A; wherein A represents said terminal hard polystyrene segments and B represents said internal soft diene-based elastomer segment and wherein the B component is about 20 to about 80 percent of said triblock elastomer, (b) about 20 to about 150 phr of filler composed of particulate, precipitated silica which contains silanol groups on the surface thereof and carbon black, wherein said filler is composed of about 10 to about 100 phr of said silica, and wherein the weight ratio of silica to carbon black is at least about 1/1, and a coupler for said silica having a moiety reactive with said silanol groups on the surface of said silica and another moiety interactive with said diene-based elastomer(s).

2. The rubber composition of claim 1 wherein, said internal diene-derived elastomer for said A-B-A triblock elastomer is an elastomer of a conjugated diene selected from at least one of 1,3-butadiene and isoprene.

3. The rubber composition of claim 1 wherein the said silica coupler is a bis-(3-trialkoxysilylpropyl) polysulfide.

4. The rubber composition of claim 1 wherein the silica is characterized by having a BET surface area in a range of about 50 to about 300 square meters per gram and a dibutylphthalate (DBP) absorption value in a range of about 150 to about 300.

5. The rubber composition of claim 1 which comprises (a) 100 parts by weight (phr) of elastomers composed of (i) about 70 to about 95 phr of at least one elastomer selected from homopolymers of isoprene or 1,3-butadiene, copolymers of isoprene and 1,3-butadiene and copolymers of isoprene and/or 1,3-butadiene and styrene or alpha-methylstyrene and, correspondingly, (ii) about 5 to about 30 phr of at least one triblock elastomer composed of terminal hard polystyrene segments and internal soft polybutadiene-based elastomer segment and having the general configuration of: A-B-A; wherein A represents said terminal hard polystyrene segments and B represents said internal soft polybutadiene elastomer segment and wherein the B component is about 20 to about 80 percent of said triblock elastomer, (b) about 25 to about 90 phr of filler composed of particulate, precipitated silica which contains silanol groups on the surface thereof and carbon black, wherein the majority of said filler is silica, and (c) a coupler for said silica composed of a silane which has a moiety reactive with the surface of said silica and another, polysulfide, moiety interactive with said diene-based elastomer(s).

6. A pneumatic tire having a rubber tread comprised of the rubber composition of claim 1.

7. A pneumatic tire having a rubber tread comprised of the rubber composition of claim 2.

8. A pneumatic tire having a rubber tread comprised of the rubber composition of claim 3.

9. A pneumatic tire having a rubber tread comprised of the rubber composition of claim 4.

10. A pneumatic tire having a rubber tread comprised of the rubber composition of claim 5.

11. The rubber composition of claim 5 wherein said silica coupler is a bis-(3-trialkoxysilylpropyl) polysulfide.

12. The rubber composition of claim 5 wherein said silica coupler is a bis-(3-triethoxysilylpropyl) tetrasulfide.

13. A tire having a rubber tread comprised of the rubber composition of claim 11.

14. A tire having a rubber tread comprised of the rubber composition of claim 12.

* * * * *